United States Patent
Takano et al.

(10) Patent No.: US 6,765,323 B2
(45) Date of Patent: Jul. 20, 2004

(54) METHOD AND DEVICE FOR DETECTING ROTATIONAL DRIVE FORCE

(75) Inventors: Tadashi Takano, Shuuchi-gun (JP); Hisashi Kazuta, Shuuchi-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/065,178

(22) Filed: Sep. 24, 2002

(65) Prior Publication Data

US 2003/0062782 A1 Apr. 3, 2003

(30) Foreign Application Priority Data

Sep. 28, 2001 (JP) ........................................ 2001-301293
Sep. 28, 2001 (JP) ........................................ 2001-301294

(51) Int. Cl.[7] ................................................ G01L 3/10
(52) U.S. Cl. ........................ 310/68 B; 318/488; 73/779
(58) Field of Search ............................ 310/68 R, 68 B, 310/67 A; 73/778, 779; 180/65.2, 65.8; 318/488

(56) References Cited

U.S. PATENT DOCUMENTS

| | | | | |
|---|---|---|---|---|
| 5,602,448 A | * | 2/1997 | Yaguchi | 318/139 |
| 5,664,636 A | * | 9/1997 | Ikuma et al. | 180/206 |
| 5,777,442 A | * | 7/1998 | Miyata | 318/2 |
| 5,818,189 A | * | 10/1998 | Uchiyama et al. | 318/488 |
| 5,831,180 A | * | 11/1998 | Tanaka et al. | 73/862.333 |
| 5,878,831 A | * | 3/1999 | Saito et al. | 180/206 |
| 6,230,831 B1 | * | 5/2001 | Ogata et al. | 180/65.1 |
| 6,320,336 B1 | * | 11/2001 | Eguchi | 318/139 |

* cited by examiner

*Primary Examiner*—Burton Mullins
(74) *Attorney, Agent, or Firm*—Ernest A Beutler

(57) ABSTRACT

Several embodiments of electric power assisted manually operated devices wherein the manual input force is sensed by a sensor that does not require lost motion connections and significant movement in order to determine the force applied. Also a compact drive is disclosed that permits the application to winding drums such as fishing reels. In addition a simplified temperature compensation system for the sensor is employed. Thus, the arrangements can be easily utilized with conventional structures with minimum change.

30 Claims, 11 Drawing Sheets

METHOD AND DEVICE FOR DETECTING ROTATIONAL DRIVE FORCE

BACKGROUND OF INVENTION

This invention relates to an improved electric motor power assist system and more particularly to an improved method and device for detecting the manually inputted drive force to the system.

A wide variety of types of systems have been proposed wherein a manual force is assisted by an electric motor. In many of these types of systems, the amount of electric motor assist provided is related to the degree of manual force applied, among other things. Therefore, the mechanisms that operate on this principal generally require some form of manual force measuring device.

This is normally done by providing some form of lost motion connection in the connection between the element to which the manual force is applied and the thing to be operated. The manual force application is measured by determining the amount of lost motion that occurs. Thus, the sensors that operate on this principal require the addition of the lost motion connection to the mechanical transmission for coupling at least the manual force applying device to the load which is driven. This makes it difficult to embody the electric power assist in conventional mechanisms merely through the use of an added electric motor or the assist.

It is, therefore, a principal object to this invention to provide an improved force sensor arrangement for an electrically assisted, manually operated device and more particularly to an improved sensor for sensing the manual force applied without necessitating a lost motion connection.

For example, in one type of device, there is employed a planetary transmission which produces relative movement in response to the lost motion and this planetary transmission then drives a force sensor. Obviously, this not only complicates the system and adds to its costs, but also makes it difficult to apply the system to conventional non-assisted mechanisms.

In another type of arrangement, the lost motion is measured by a pair of cylindrical cams which are held in contact with each other by a spring and relative movement occurs when the manual force is applied. The degree of manual force is measured by measuring the degree of relative movement. Again, this type of device adds to the costs and complexity of the system and makes it difficult to incorporate into conventional non-assisted mechanisms. In addition, the accuracy of these devices is dependent upon maintaining a consistent degree of lost motion for a given force input which requires bearings and lubrication and also which can be adversely effected by temperature changes.

It is, therefore, a still further object to this invention to provide an improved force sensor for an electric power assisted system wherein lost motion is not necessary in order to measure the applied force.

As noted above, temperature variations can result in variations in the amount of assist provided in response to a given input force. Even if lost motion is eliminated, this can still present some problems. It is, therefore, a further object of this invention to provide an electric power assisted system in which temperature variations will not adversely effect the performance.

The type of power assist mechanisms previously employed have not lent themselves to applications where such assist is desirable. For example in winding drums such as fishing reels power assist is desirable, but not possible with the power assist mechanisms previously employed. It is, therefore, a still further object of this invention/n to provide a compact power assist mechanism that is compact enough for such applications.

SUMMARY OF INVENTION

A first feature of this invention is adapted to be embodied in an electrically assisted, manually powered unit. The unit includes a manual drive element receiving a manual input force from an operator, an electric motor for providing an assist force, a transmission arrangement for receiving a driving force from the manual drive element and the electric motor and driving the unit. A force sensor senses the manual force applied to the manual drive element and delivers an output signal indicative of the manual force. A control controls the operation of the electric motor. The control has a sensor input stage receiving the signal from the force sensor and a logic for determining the operation of the electric motor from at least the signal from the force sensor. The force sensor provides the force signal without necessitating any significant displacement of a component thereof.

Another feature of the invention is adapted to be embodied in an electrically assisted, manually powered unit. The invention in accordance with this feature includes a manual drive element receiving a manual input force from an operator. An electric motor for providing an assist force is also used. A transmission arrangement receives a driving force from the manual drive element and the electric motor for driving said unit. A force sensor senses the manual force applied to the manual drive element and delivers an output signal indicative of the manual force. A control controls the operation of the electric motor. The control has a sensor input stage receiving the signal from the force sensor and a logic for determining the operation of the electric motor from at least the signal from the force sensor. The force sensor includes a first electrical device providing a signal indicative of applied force. A second electrical device capable of providing a signal indicative of applied force is also employed. The manual force is applied only to the first electrical device. The first and the second electrical devices are positioned in proximity to each other so as to experience the same temperature. Finally, a circuit connects the first and the second electrical devices to provide a temperature compensated signal to the sensor input stage of the control.

A third feature of the invention is adapted to be embodied in a an electrically assisted, manually powered reel. The reel includes a manual drive element receiving a manual input force from an operator, an electric motor for providing an assist force, a transmission arrangement for receiving a driving force from the manual drive element and the electric motor and driving the reel. A force sensor senses the manual force applied to the manual drive element and delivers an output signal indicative of the manual force. A control controls the operation of the electric motor. The control has a sensor input stage receiving the signal from the force sensor and a logic for determining the operation of the electric motor from at least the signal from the force sensor.

DETAILED DESCRIPTION

Figure 1:
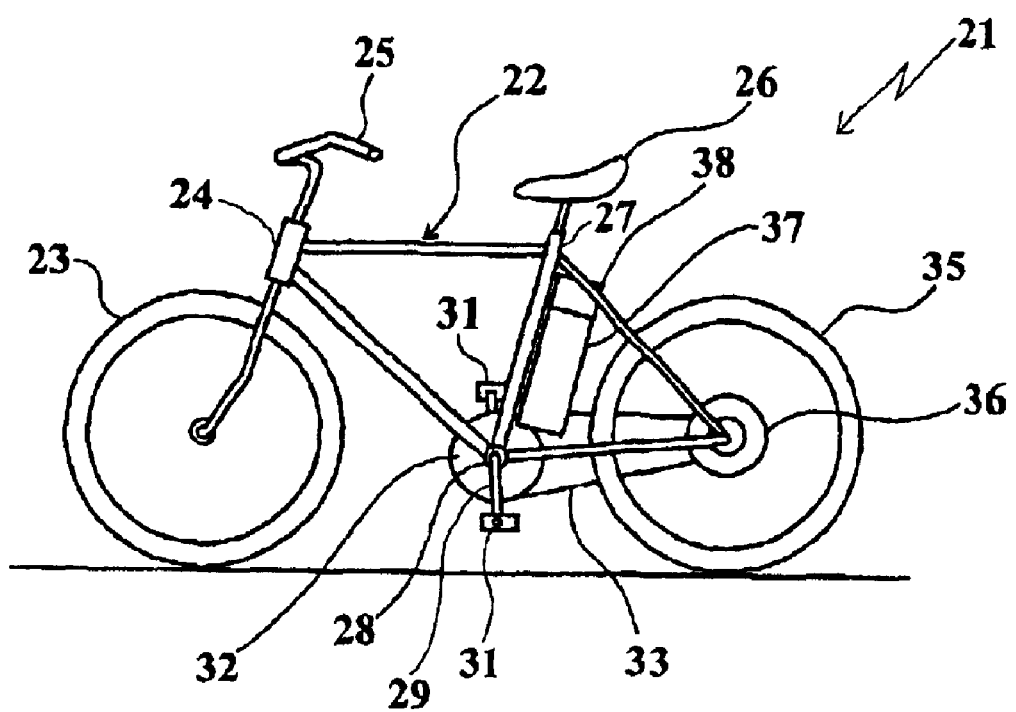
FIG. 1 is a side elevational view of an electric power assisted bicycle constructed in accordance with a first embodiment of the invention.

Referring now in details to the drawings and initially to the embodiment of FIGS. 1 through 5 and initially primarily to FIG. 1, a manually operated electric power assisted unit in the form of a vehicle is shown and indicated generally by the reference numeral 21. In this embodiment, the vehicle is in the form of a bicycle having a tubular frame assembly, indicated generally by the reference numeral 22.

A front wheel 23 is dirigibly supported by a head pipe 24 of the frame assembly 22 and is steered by a handle bar assembly 25 in a well known manner.

A seat 26 is adjustably supported by a seat pipe 27 of the frame 22 for accommodating a seated rider in a well known manner. At the bottom of the seat pipe 27, is provided a bracket 28 on which a crankshaft 29 is rotatably journaled in a well known manner. Pedals 31 at the ends of the crank arms of the crankshaft 29 are operated by a rider seated on the seat 26 to drive a driving sprocket 32.

Figure 3:
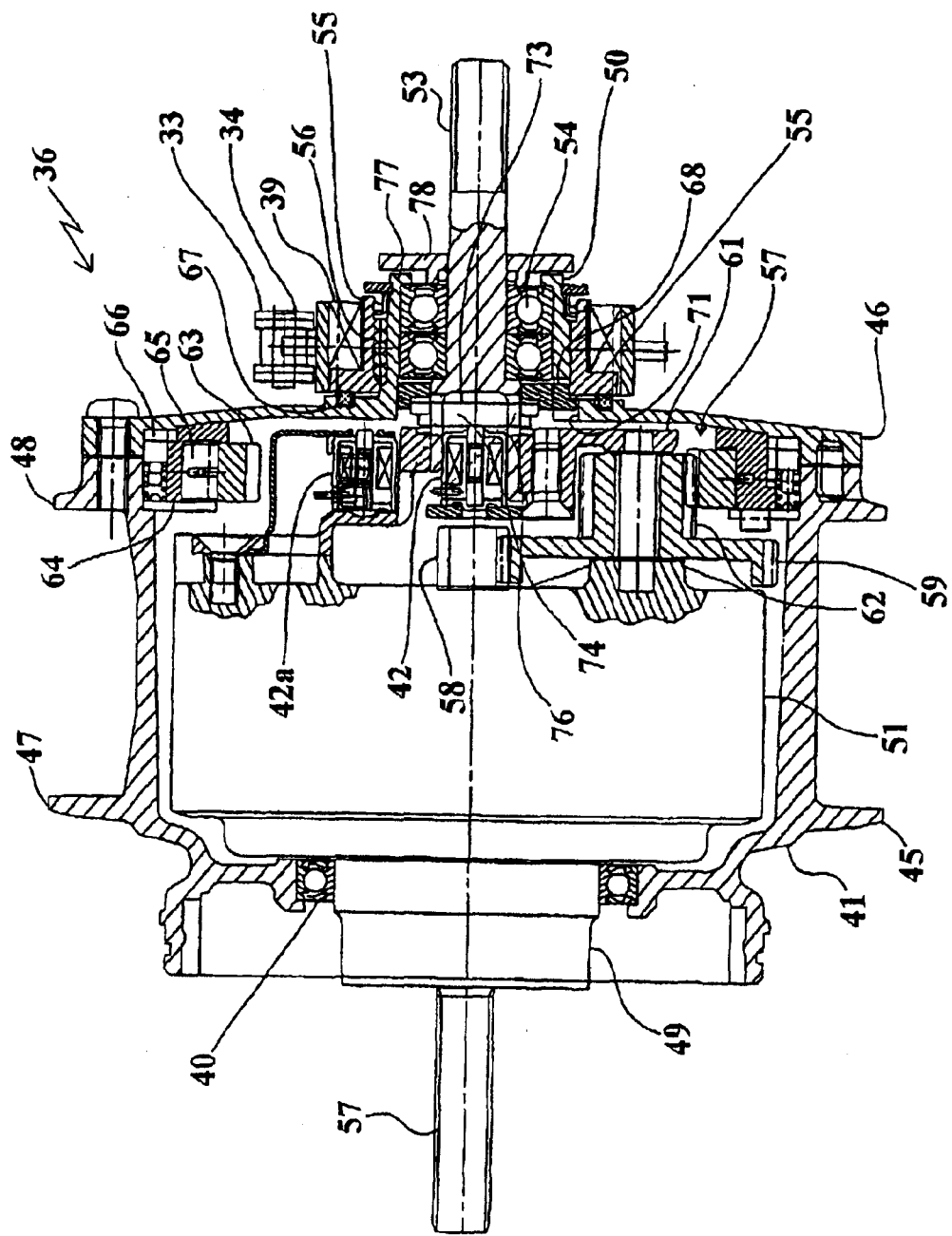
FIG. 3 is an enlarged cross sectional view taken though the axis of rotation of the driving wheel and shows the force sensor arrangement as well as the assist motor.

The driving sprocket 32, in turn, drives a chain 33 which, in turn, drives a driven sprocket 34 (FIG. 3). The driven sprocket 34 transmit the drive to a rear wheel 35 that is journeyed at the rear end of the frame assembly 22 via a drive arrangement, indicated generally by the reference numeral 36 and which is shown in most detail in FIG. 3.

Still referring to FIG. 1, the drive assembly 36 includes an electric assist motor which receives electrical power from a battery 37 that is carried by a battery box 38 at a rear portion of the frame assembly 22 forwardly of the rear wheel 35.

Before describing the drive assembly 36 in detail by reference to FIG. 3, the general relationship will be described first by reference to the schematic view of FIG. 2. As seen in this figure, the drive assembly 36 is comprised of a one-way clutch 39 which, in this specific embodiment, is interposed in the connection between the driven sprocket 34 and the rear wheel 35. This one-way clutch in turn transfers the drive to the rear wheel through a hub case 41. A pedal force detector 42 is interposed in this transmission relationship in a manner to be described. It should be noted, however, that unlike the prior art constructions, the pedal force detection device 42 does not require lost motion for its operation. Hence, a much simpler detector can be employed and the basic driving arrangement and hub construction can be generally conventional and embodied in a conventional housing.

Figure 2:
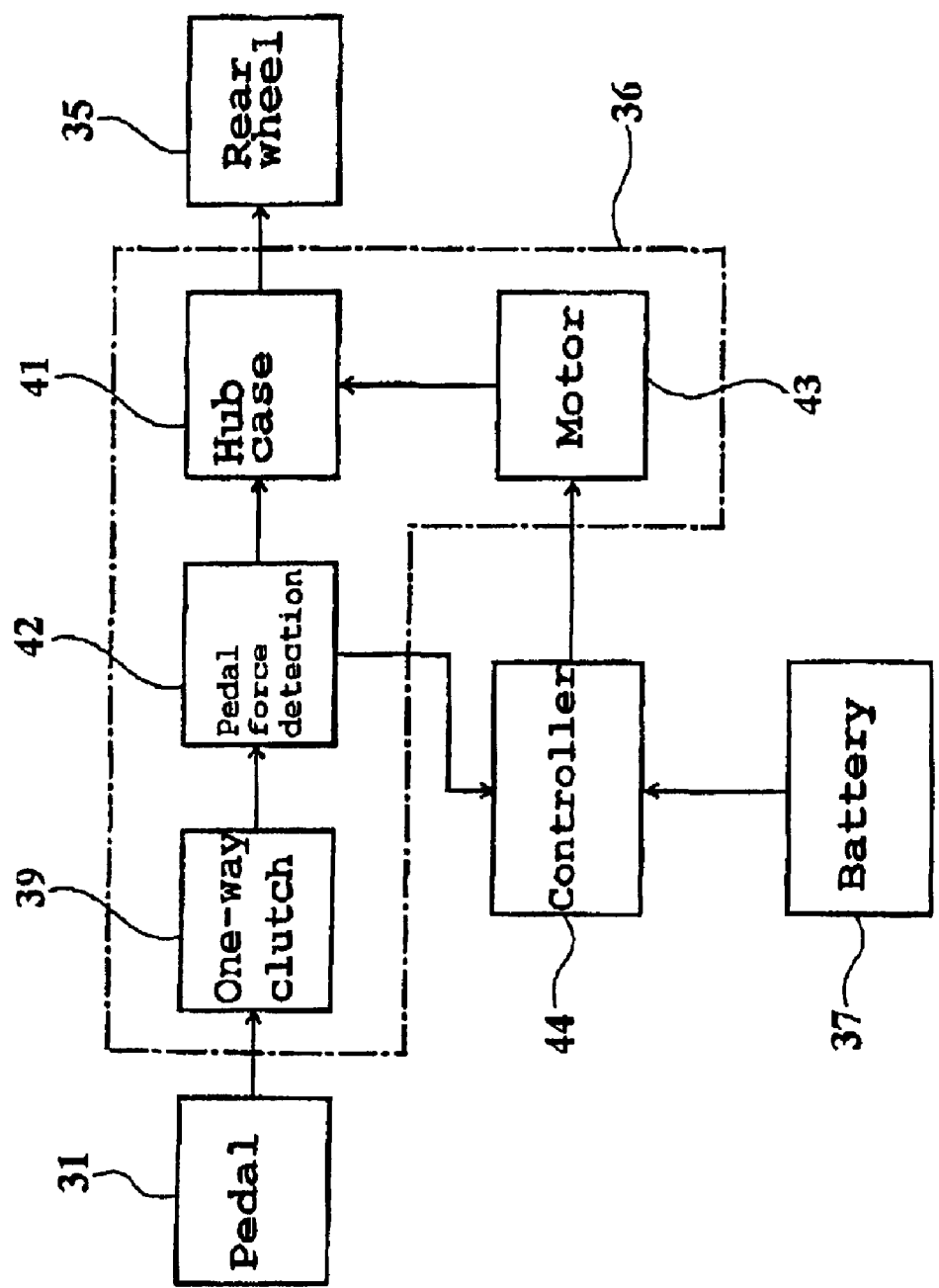
FIG. 2 is a partially schematic block diagram showing the components of the drive and power assist system.

In addition to the manual force transmitted to the rear wheel 35 there is also provided a selective power assist from an electric motor, indicated schematically at 43 in FIG. 2. This electric motor 43 assists the drive of the hub case 41 in a manner which will be described in more detail by reference to FIG. 3.

The electric motor 43 has electrical power supplied to it from the battery 37 via a controller 44. The controller 44 may of any type well known in this art and basically operates on the principal that the amount of electric motor assist is proportional to the force applied by the rider applied to the pedals 31 as determined by the pedal force detector 42. The controller 44 may also operate so as to provide a varying power assist that is greater at lower speeds and decreases as speed of the vehicle and specifically the rear wheel drive 35 increases. Of course, those skilled in the art will readily understand how the invention can be utilized in conjunction with various types of control arrangements. Also to state again, although this embodiment describes the invention in connection with a vehicle such as a bicycle, but as will become apparently from the following description the invention can be utilized with a wide variety of types of manually operated units in which electric power assist is desirable.

Referring now in detail to FIG. 3, the hub case 41 is comprised of a first generally cup-shape portion 45 that defines a cavity in which the electric motor 43 is positioned in a manner to be described. This cavity is closed by a cover plate 46 of the hub case 41 which completes its assembly. These pieces define flanges 47 and 48 on which the spokes of the rear wheel 43 are joined in a manner well known in the art.

This hub case 41 is rotatably journalled on the frame assembly 22. This journaling is provided by a first bearing 40 that cooperates with an extension 49 that is formed of an outer housing 51 of the motor 43. The extension 49 terminates in an axle 52 that is fixed in a known manner to the bicycle frame 22. At the opposite side thereof, the hub case 41 is journaled on a stub axle shaft 53. This journaling is provided by a ball bearing assembly 54 contained within a cylindrical extension 50 of the hub case end closure 46.

The driven sprocket 34 is connected via the one-way clutch 39 to an outer member 55 of a helical spline connection provided by balls 56 trapped in the helical splines formed in the inner portion of the member 55 and the outer surface of the projection 50 of the hub case closure plate 46. This helical connection provided by the balls 56 has a slight skew so as to create an axial force on the hub case 41 and specifically the end plate 46 thereof under the influence of driving forces. As will become apparent later, this force is measured and provides the signal to the pedal force detector 42 which, in this embodiment, is comprised of a magnetostrictive sensor 42 mounted in manner to be described.

The electric power assist from the electric motor 43 is transmitted to the hub case 41 via a planetary transmission, indicated generally by the reference numeral 57. This transmission includes a sun gear 58 which is affixed to the output shaft of the electric motor 43. This sun gear 58 is enmeshed with the larger diameter gear portions 59 of three planet gears (only one of which is shown in FIG. 3) that are circumferentially spaced and are journalled on a planet carrier 61. Smaller diameter portions 62 of these planet gears are enmeshed with a ring gear 63 which is associated with the cover plate 46 and is mounted to the cover plate. To this end, the ring gear 63 is connected to a mounting member 64 via a one-way clutch 65. The mounting member 64 is connected to the hub case cover 46 via an overload release connection 66 which will release upon excessive loading to prevent damage. Of course, the described transmission is only one of many types that may be utilized to transmit drive from the electric motor 43 to the rear wheel 35.

Figure 4:
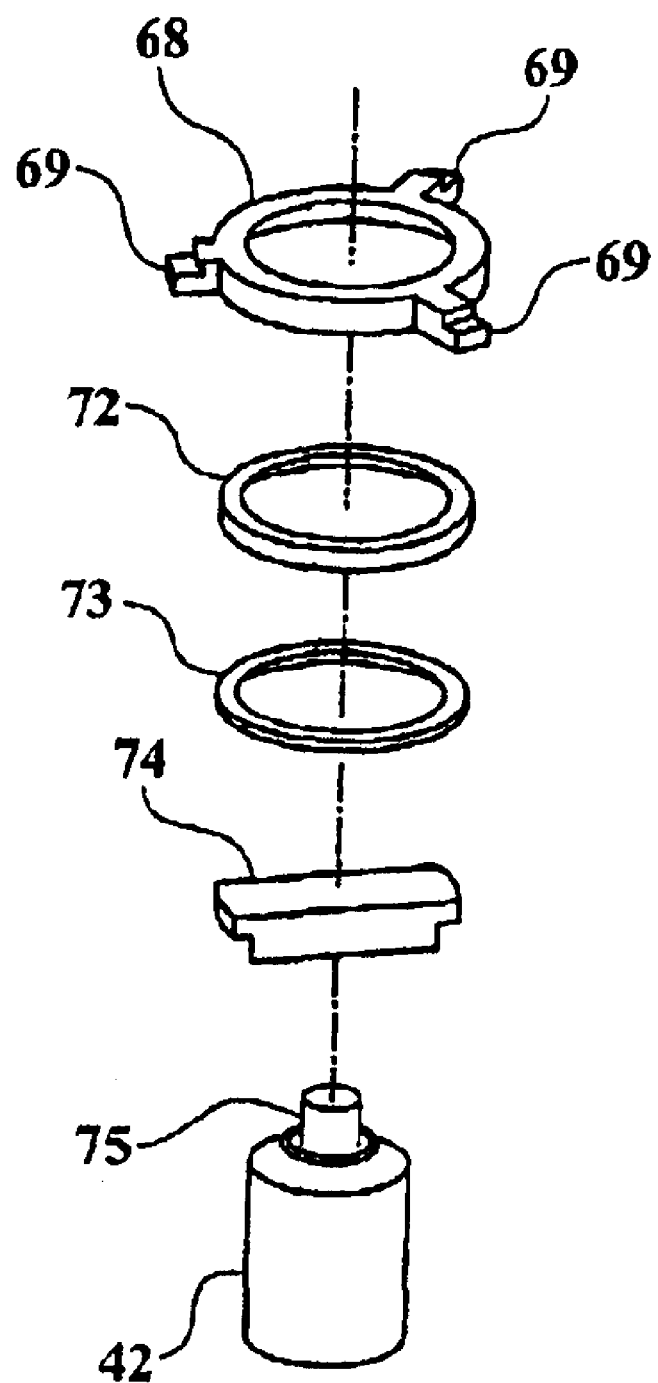
FIG. 4 is an exploded perspective view showing the force sensor and its actuating mechanism.

The arrangement for transmitting the degree of manual driving force to the pedal force detector 42 will now be described by primary reference to FIGS. 3 and 4. It has been noted that the helical spline connection provided by the balls 56 causes an axial force on the hub case 41 in response to the driving force. A water tight seal 67 is provided between the end of the hub case cover 46 and the member 55. The member 55 is abutingly engaged with a force taking ring 68, as best seen in FIG. 4, and specifically with three outwardly extending tab portions 69 thereof. These tabs portions 69 are received in slots 71 formed in an opening of the hub case cover plate 46 so as to hold them against rotation.

The force taking ring 68, in turn, bears against a thrust bearing 72 which, in turn, engages a retainer 73. This, in turn, engages a cross piece 74 that has a pair of arm portions that are also retained in the opening 71 and thus held against rotation. This cross piece 74 is engaged with a detector portion 75 of the magneto-strictive sensor 42. The sensor 42 is, in turn, mounted on an extension 76 of the cover of the motor 43. It should be noted that driving thrust in one direction is resisted by the connection to the sensor 42. Driving thrust in the event the pedal rotation is reversed, is taken by end portions 77 of the extension 50 of end cap 46 with a thrust member 78 that is fixed relative to the axle shaft 53.

Figure 5:
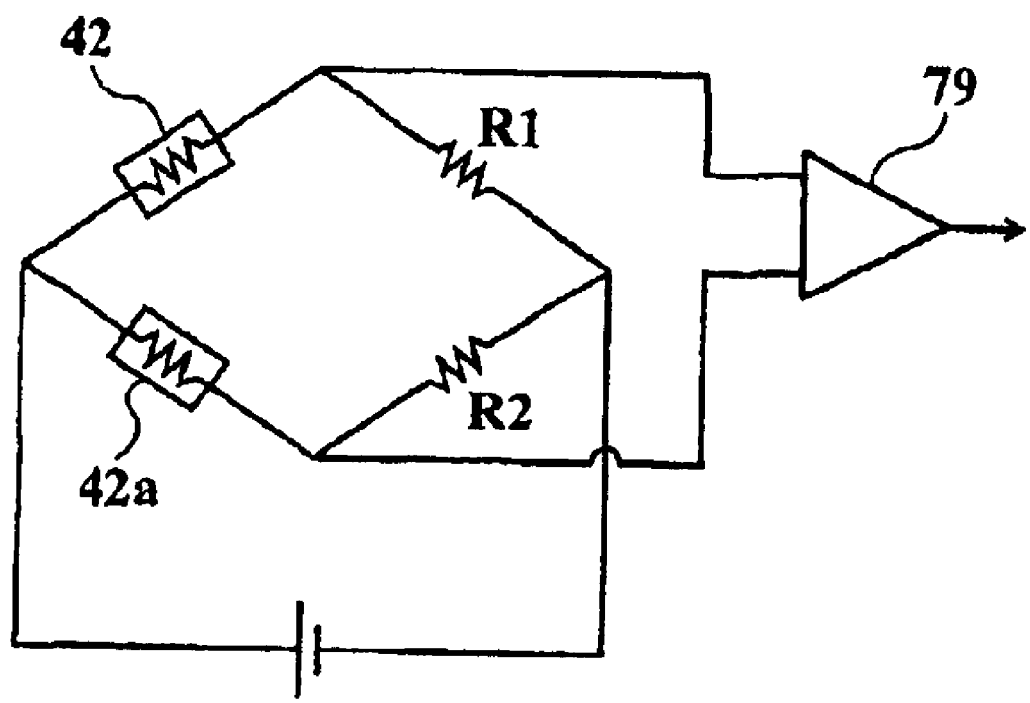
FIG. 5 is a schematic electrical diagram of the force sensor and shows how temperature compensation is effected.

In accordance with temperature compensating features of the invention, a dummy sensor 42a is mounted at one side of the sensor assembly 42 and is provided in the electrical circuit as will be described by reference to FIG. 5 to provide temperature compensation. Referring now to FIG. 5, the electrical connection for the pedal force detector 42 will be described along with this temperature compensation.

A bridge circuit is formed between the sensor 42 and the dummy sensor 42a and a pair of resistors R1 and R2. These the outputs are connected to an amplifier 79 that outputs a temperature compensated signal because of the unbalance voltage between the output terminals of the sensor 42 and the dummy sensor 42a, that receives no load. The amplifier 79 outputs its signal to the controller 44 as seen in FIG. 2 so as to provide the pedal force signal without necessitating any significant movement of the components and thus, avoids the lost motion connections of the prior art.

Figure 6:
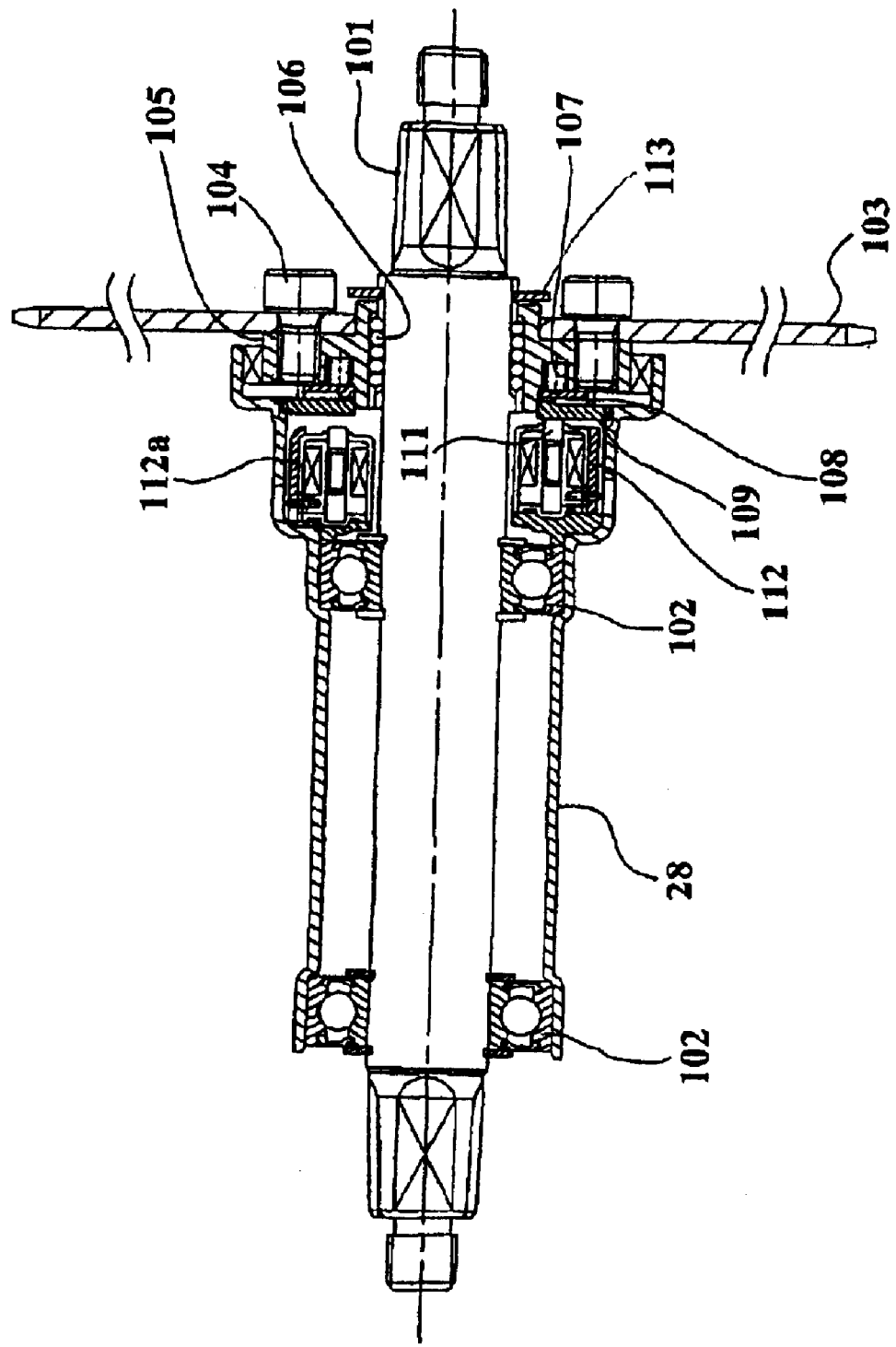
FIG. 6 is a cross sectional view taken through the crank mechanism of a power assisted bicycle constructed in accordance with a second embodiment of the invention and shows the force sensor associated therewith.

Thus, from the foregoing description, it should be readily apparent that the utilization of the structure shown in this embodiment necessitates no changes in the basic structure of the bicycle frame and merely requires the incorporation of the assist mechanism within the hub case of the driven wheel. Although the pedal force detector is positioned at the connection of pedal force to the driven sprocket, a similar arrangement could also be employed at the driving sprocket 32 adjacent the frame bracket 28 without any other change to the basic frame assembly of the vehicle 21. Such an embodiment is shown in FIG. 6 and will now be described by reference to that figure. The crankshaft, indicated by the reference numeral 101 in this embodiment, is supported in the frame bracket 28 by means of a pair of transversely spaced ball bearings 102.

The driving sprocket, indicated here at 103, is connected by means of fasteners 104 to an outer element 105 of a helical spline connection to the crankshaft 101. This helical spline connection includes a plurality of balls 106. When a rotational force is exerted on the driving sprocket 103 this force is transmitted to the spline outer element 105 and the balls 106 in the helical spline place an axial force on the outer element 105 tending to move it toward the left.

A series of circumferentially spaced coil springs 107 press against a thrust plate 108, which in turn, acts against a force transmitter 109 that is engaged with the contact arm 111 of a magnostrictive sensor 112. As with the previously described embodiment, the magnostrictive sensor 112 is in a circuit with a dummy sensor 112a that is mounted in proximity to it and which is in a bridging circuit to provide the force signal to the controller as with the previously described embodiment.

The thrust exerted on the drive sprocket 103 by rotational movement of the crankshaft 101 in the opposite direction is resisted by a thrust plate 113 fixed on the opposite side of the crankshaft 101 and adjacent the drive sprocket 103.

Figure 7:
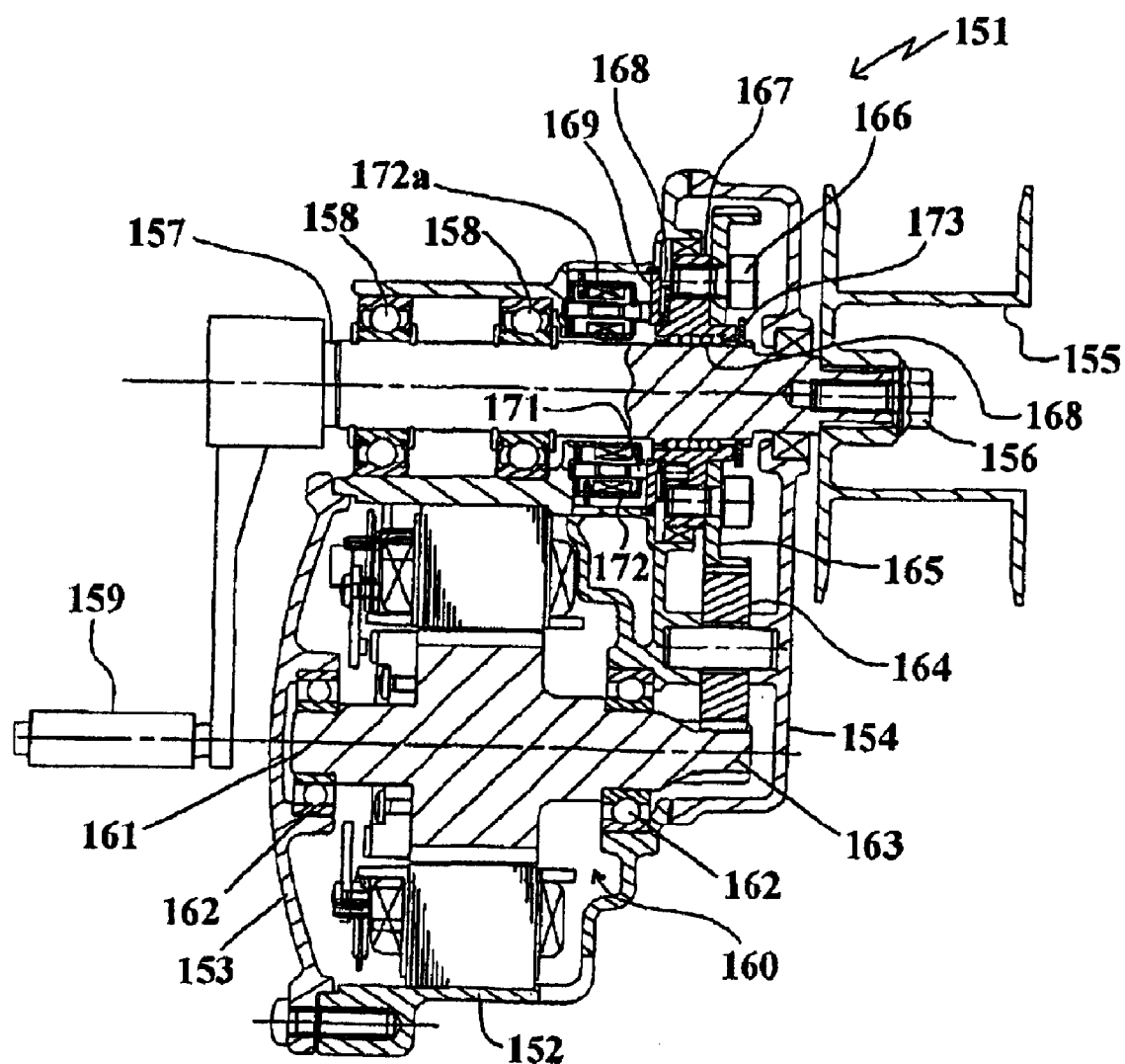
FIG. 7 is a cross sectional view taken through a manually rotated electric motor assisted winding drum constructed in accordance with a third embodiment of the invention.

In the two embodiments as thus far described, the invention has been described in conjunction with an electric power assist for a manually powered bicycle. FIG. 7 shows another embodiment of the invention that is embodied in a manually powered reel or drum such as a fishing reel that is provided with an electric power assist. This reel mechanism is indicated generally by the reference numeral 151.

The reel includes an outer housing that is comprised of a central member 152 closed at its opposite sides by end closures 153 and 154. A reel drum 155 is affixed, by means of a fastener 156 to one end of a reel shaft 157. This reel shaft 157 is journalled in the housing member 152 by means of a pair of spaced ball bearings A crank arm 159 is fixed to the opposite end of the crankshaft 157 from the drum 155 for rotating the drum 155 manually so as to wind a line or the like on it.

An electric assist motor, indicated generally by the reference numeral 160, is mounted within the housing. The electric motor 160 has an output shaft 161 that is journalled by a pair of ball bearings 162 carried by the end plate 153 and main housing member 152. One end of the electric motor output shaft 161 is formed with an integral pinion 163 which drives a reduction gear 164. The reduction gear 164 is engaged with a further reduction gear 165 that is fixed by means of threaded fasteners 166 to an outer member 167 of a helical spline connection to the crankshaft 157. This connection with the crankshaft 157 includes balls 168.

When a manual force is exerted on the crank handle 159 to turn the crankshaft 158, to take up a line on the drum 155, a axial force will be exerted because the spline connection of the outer member 167. This places a force on a thrust member 168, which is in turn, engaged with a thrust plate 169. The thrust plate 169 is engaged with the contact 171 of a magnostrictive sensor 172.

This sensor 172 is provided in a bridged resistor circuit with a controller as with the first described embodiment along with a dummy sensor 172a to provide temperature compensation. Thus, again the force is sensed without necessitating a lost motion connection and without requiring any significant movement for actuating the sensor.

When the crank handle 1159 is turned in the opposite direction, the thrust in this direction is taken by a thrust washer 173 affixed to the crankshaft 157 on the opposite side from the sensors 172 and 172a.

A one-way clutch, not shown, may be interposed in the connection between the electric motor driven gear 165 and the member 167 of spline connection so as to permit rotation in the opposite direction without driving the electric motor shaft 161 under this condition.

Figure 8:
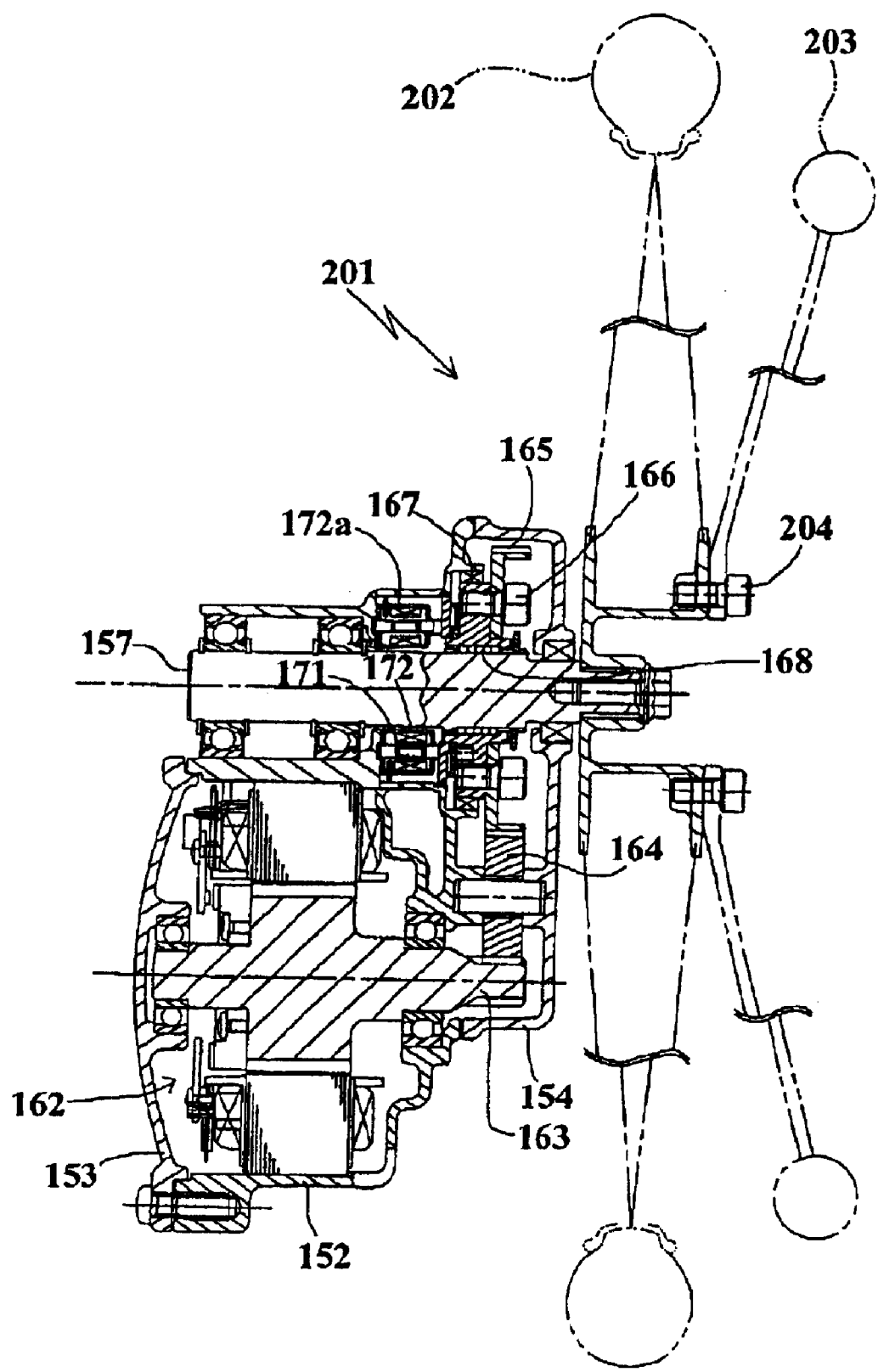
FIG. 8 is a cross sectional view taken through the axle of a wheel of a wheelchair having an electric motor assist in accordance with a fourth embodiment of the invention.

FIG. 8 shows another embodiment of the invention that utilizes an electric power assist mechanism similar to those shown in FIG. 7 but, in this instance, applied to drive a wheel of a wheelchair which is shown only partially and indicated generally by the reference numeral 201. The wheelchair wheel is indicated at 202 and has associated with it a passenger operated hand wheel 203 with which the operator may rotate the wheelchair wheel 202. Threaded fasteners 204 connect the hand wheel 203 to the wheelchair wheel 202.

The wheelchair wheel 202 is affixed to one end of a shaft, which shaft is indicated by the same reference numeral 157 as the crankshaft in the embodiment of FIG. 7 since the electric motor assist and the sensor arrangement for it are the same as that shown in that figure. For this reason, like components have been identified by the same reference numerals as applied in FIG. 7 and a further description of them in this embodiment is not believed to be necessary to permit those skilled in the art to practice the invention. However the housing assembly comprising the housing member 152 and its end closures 153 and 154 are affixed in any desired manner to the frame of the wheelchair 201, thus simplifying the addition of the electric motor assist to conventional wheelchair constructions.

Figure 9:
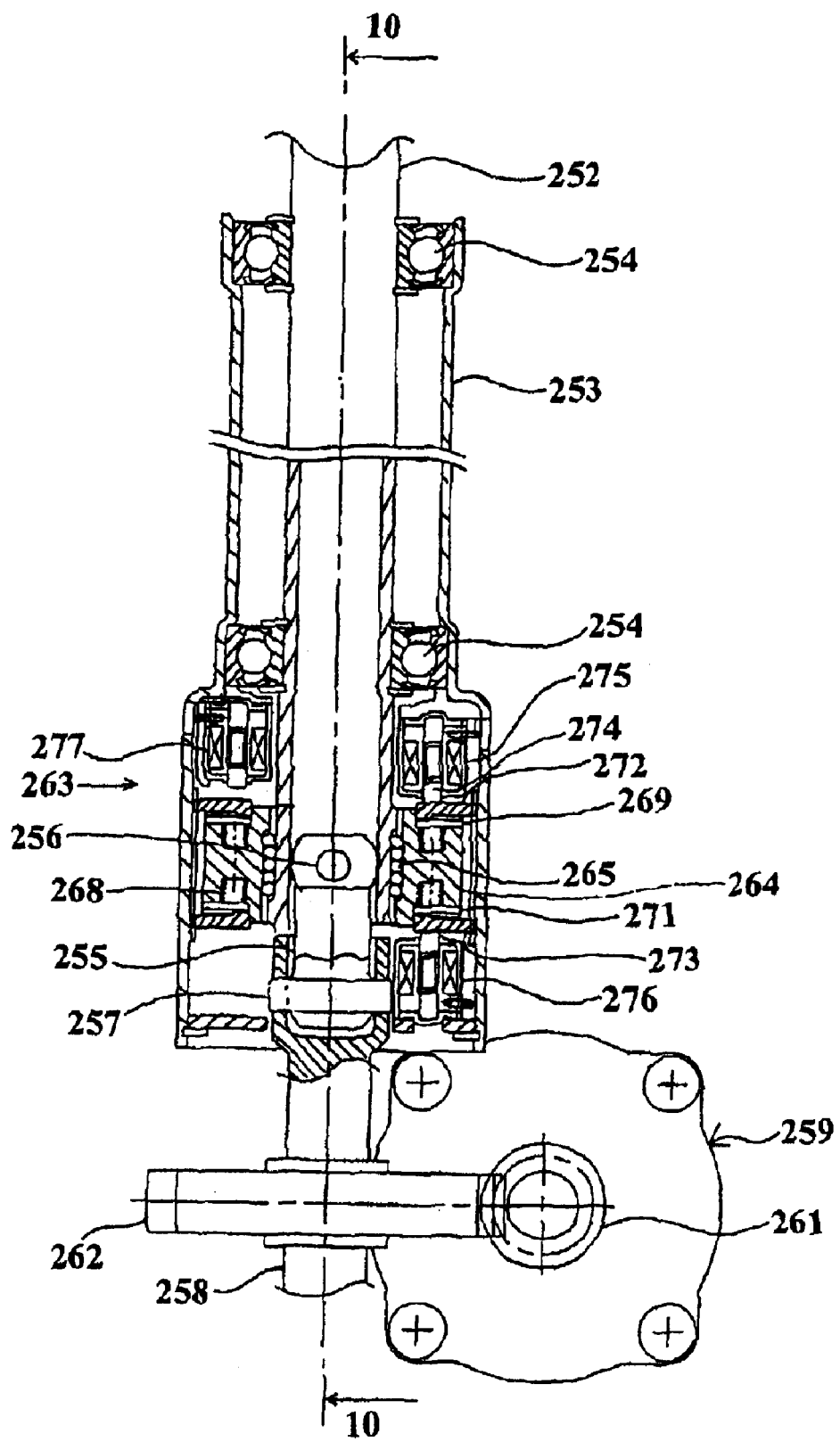
FIG. 9 is a cross sectional view taken through the steering shaft of an electric motor power assisted steering mechanism in accordance with a fifth embodiment of the invention.
Figure 10:
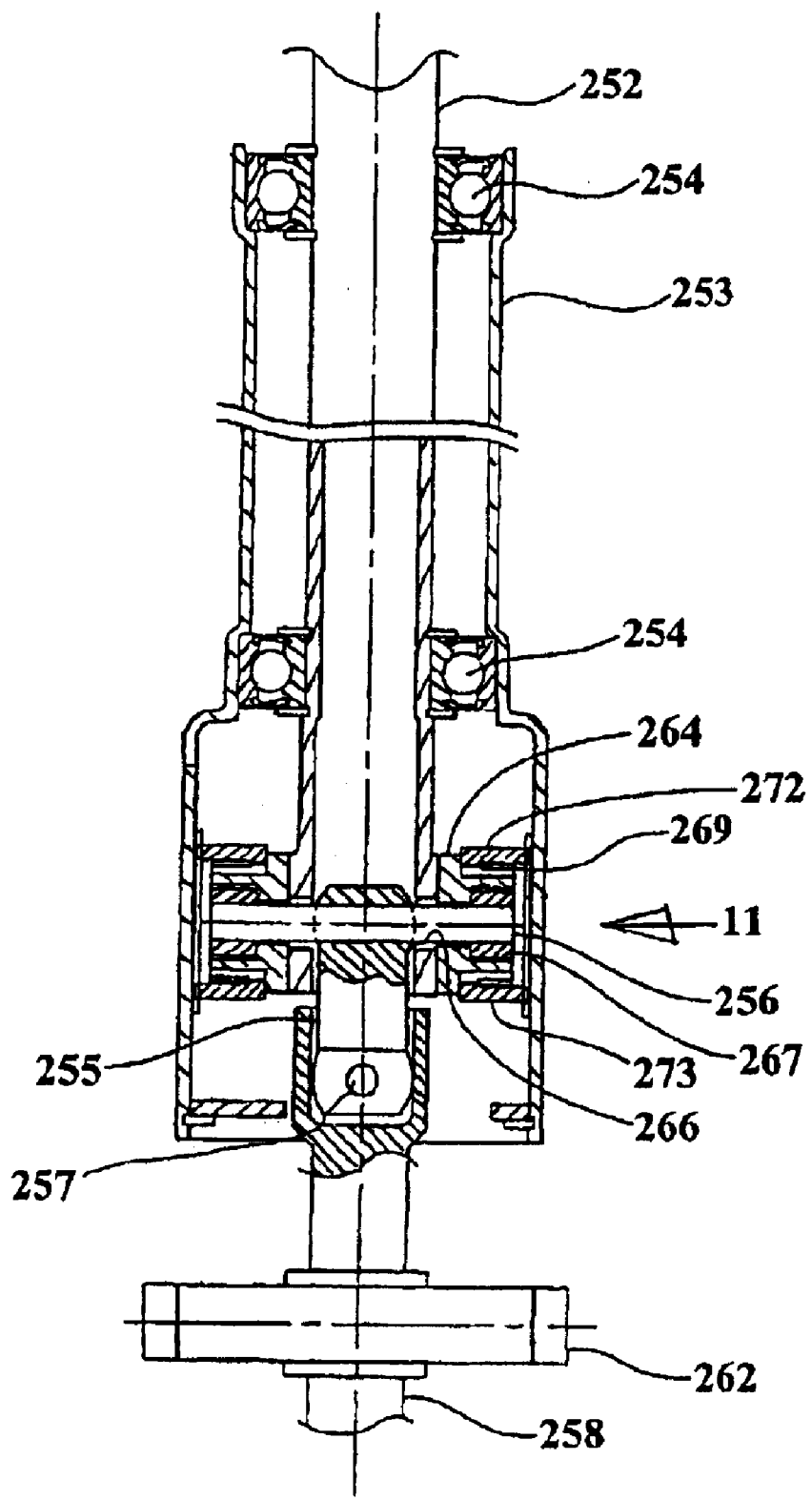
FIG. 10 is a cross sectional view taken along the line 10—10 of FIG. 9.
Figure 11:
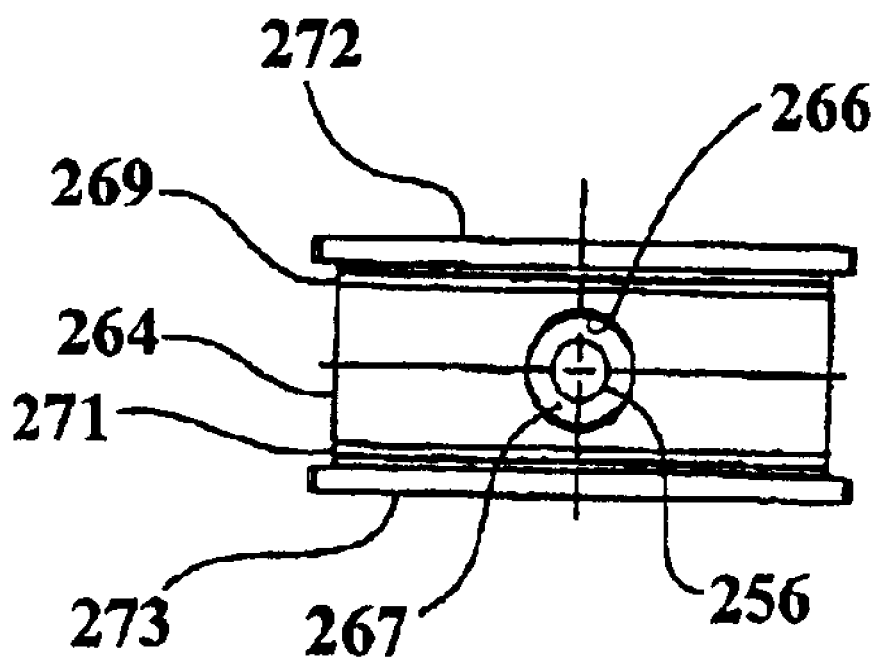
FIG. 11 is an enlarged view looking in the direction of the arrow 11 in FIG. 10 and shows the connection for loading the sensor.

FIGS. 9 through 11 show a still further embodiment of the invention that is adapted to be employed in an electrically assisted, manually operated, steering system for a vehicle, shown partially and indicated generally by the reference numeral 251. This steering mechanism 251 includes a manually operated steering shaft 252 that is journalled within a housing assembly 253 by means of spaced apart ball bearings 254.

At the lower end of the steering shaft 252, there is provided a short stub shaft 255 to which the steering shaft 252 is connected by means of a pin connection embodying a pin 256. The lower end of this shaft 255 has a pin connection provided by a pin 257 to a steering shaft 258 of the vehicle which is connected to the dirigible vehicle wheels in any known type manner.

For power assist of the steering, there is provided an electric steering assist motor, indicated generally by the reference numeral 259, which has an output shaft on which a worm gear 261 is affixed. This worm gear 261 is engagement with a worm wheel 262 fixed to the steering shaft 258 for providing power assist.

In this embodiment, the electric assist motor 259 is a reversible electric motor and power assist is given when the steering shaft 252 is rotated in either direction and an appropriate force applied thereto. The steering force sensor arrangement, indicated generally by the reference numeral 263, includes an outer spline connection member 264 which has a helical spline connection with the lower end of the steering shaft 252 by means that include a plurality of balls 265.

As may be seen in FIGS. 10 and 11, the pin 256 passes through an opening 266 in the lower end of the steering shaft 252 that is elongated so as to provide some clearance in the direction of the rotational axis of the steering shaft 252 for roller members 267 that are carried on the ends of the pin 256. Coil compression springs 268 are carried in the member 264 and bear against upper and lower thrust members 269 and 271, respectively. These members 269 and 271, in turn, act upon bearing plates 272 and 273 which are engaged with the contact elements 274 of upper and lower magnostrictive sensors 275 and 276.

Since power assist is required in both directions, the sensors 275 or 276 will be activated in response to the steering force inputted to the steering shaft 252 depending upon the direction of rotation. These sensors 275 and 276 are placed in circuits that include a dummy sensor 277 for temperature compensation as with the previously described embodiment. Thus, a compensated output will be outputted to the controller for providing the desired degree of power assist in accordance with any desired strategy.

Thus, from the forgoing description it should be readily apparent that the number of embodiments disclosed each provides very effective force sensors for sensing the manual input force for control of electric power assist in a wide variety of devices. Since the sensors require no significant movement, no lost motion is present in the system and incorporation of the device in the desired unit is simplified with out changing the basic construction of the device which is to be power assisted. Although all of the embodiments illustrated employ magneto-strictive sensors for sensing force, other types of force rather than motion detecting sensors such as strain gauges can be employed for sensing the force generated through the helical spline connection. Of course, the foregoing description is that of preferred embodiments of the invention and various changes and modifications may be made without departing from the sprit and scope of the invention, as defined by the appended claims.

What is claimed is:

1. An electrically assisted, manually powered unit, a manual drive element moveable in at least a first direction in response to receiving a manual input force from an operator, an electric motor for providing an assist force, a transmission arrangement for receiving a driving force front each of said manual drive element and said electric motor and driving said electrically assisted, manually powered unit, a force sensor, a mechanical force transmitting device for transmitting a force applied to said manual drive element to apply a force in a direction other than said first direction to said force sensor for sensing the manual force applied to said manual drive element and delivering an output signal indicative of said manual force, a control for controlling the operation of said electric motor, said control having a sensor input stage receiving the signal from said force sensor and a logic for determining the operation of said electric motor from at least said signal from said force sensor, said force sensor providing said force signal without necessitating any significant displacement of a component thereof.

2. An electrically assisted, manually powered unit as set forth in claim 1, wherein the force sensor is a magnetostrictive sensor.

3. An electrically assisted, manually powered unit as set forth in claim 1, wherein the force sensor is a stress detection sensor.

4. An electrically assisted, manually powered unit as set forth in claim 1, wherein the unit comprises a propulsion element for propelling a vehicle along a terrain.

5. An electrically assisted, manually powered unit as set forth in claim 4, wherein the propulsion element comprises a wheel of a land vehicle.

6. An electrically assisted, manually powered unit as set forth in claim 5, wherein the vehicle comprises a bicycle.

7. An electrically assisted, manually powered unit as set forth in claim 5, wherein the vehicle comprises a wheelchair.

8. An electrically assisted, manually powered unit as set forth in claim 1, wherein the unit comprises a drum and the manual drive element comprises a crank handle.

9. An electrically assisted, manually powered unit as set forth in claim 1, wherein the unit comprises a dirigible wheel and the manual drive element comprises a steering shaft.

10. An electrically assisted, manually powered unit as set forth in claim 1, wherein the manual drive element is moveable in two, opposite directions.

11. An electrically assisted, manually powered unit as set forth in claim 10, wherein the force sensor senses the manual force in only one direction and the electric motor provides an assist force only in that one direction.

12. An electrically assisted, manually powered unit as set forth in claim 10, wherein the force sensor senses the manual force in both directions and the electric motor provides an assist force in both directions.

13. An electrically assisted, manually powered unit as set forth in claim 1, wherein the mechanical force transmitting device comprises a helical spline connection in the transmission arrangement.

14. An electrically assisted, manually powered unit as set forth in claim 13, wherein the helical spline connection is in the portion of the transmission arrangement connecting the manual drive element to the unit.

15. An electrically assisted, manually powered unit as set forth in claim 14, wherein the manual drive element is moveable in two, opposite directions.

16. An electrically assisted, manually powered unit as set forth in claim 15, wherein the force sensor senses the manual force in only one direction and the electric motor provides an assist force only in that one direction.

17. An electrically assisted, manually powered unit as set forth in claim 16, wherein a thrust taking member resists relative axial movement of the helical spline connection when the manual force of the drive element is in the direction opposite to the one direction.

18. An electrically assisted, manually powered unit as set forth in claim 14, wherein the unit comprises a propulsion element for propelling a vehicle along a terrain.

19. An electrically assisted, manually powered unit as set forth in claim 15, wherein the vehicle is a bicycle and the manual drive element comprises a pedal driven crankshaft.

20. An electrically assisted, manually powered unit as set forth in claim 19, wherein the transmission arrangement comprises a driving sprocket driven by the pedal driven crankshaft, a chain driven by the driving sprocket and a driven sprocket associated with a driven wheel which wheel comprises the unit.

21. An electrically assisted, manually powered unit as set forth in claim 17, wherein the helical spline connection is in the connection between the driving sprocket and the pedal driven crankshaft.

22. An electrically assisted, manually powered unit as set forth in claim 21, wherein the helical spline connection is in the connection between the driven sprocket and the driven wheel.

23. An electrically assisted, manually powered unit as set forth in claim 15, wherein the vehicle is a wheelchair and the manual drive element comprises a hand wheel.

24. An electrically assisted, manually powered unit as set forth in claim 15, wherein the unit comprises a dirigible wheel and the manual drive element comprises a steering shaft.

25. An electrically assisted, manually powered unit as set forth in claim 15, wherein the unit comprises a drum and the manual drive element comprises a crank handle.

26. An electrically assisted, manually powered unit, a manual drive element receiving a manual input force from an operator, an electric motor for providing an assist force, a transmission arrangement for receiving a driving force from said manual drive element and said electric motor and driving said unit, a force sensor for sensing the manual force applied to said manual drive element and delivering an output signal indicative of said manual force, a control for controlling the operation of said electric motor, said control having a sensor input stage receiving the signal from said force sensor and a logic for determining the operation of said electric motor from at least said signal from said force sensor, said force sensor providing said force signal without necessitating any significant displacement of a component thereof, said force sensor being connected to the load in a circuit having a compensating sensor that does not experience the load but is in a proximate position to said force sensor to provide temperature compensation.

27. An electrically assisted, manually powered unit as set forth in claim 26, wherein the force sensor comprises a first electrical device providing a signal indicative of applied force, the compensating sensor comprises a second electrical device providing a signal indicative of applied force, the manual force being applied only to said first electrical device, said first and said second electrical devices being positioned in proximity to each other so as to experience the same temperature and a circuit connecting said first and said second electrical devices to provide a temperature compensated signal to said sensor input stage of said control.

28. An electrically assisted, manually powered unit as set forth in claim 27 wherein the circuit connecting the first and the second electrical devices is a bridging circuit containing first and second resistors in respective series circuits with said first and said second electrical devices.

29. An electrically assisted, manually powered unit, a manual drive element receiving a manual input force from an operator, an electric motor for providing an assist force, a transmission arrangement for receiving a driving force from said manual drive element and said electric motor and driving said unit, a force sensor for sensing the manual force applied to said manual drive element and delivering an output signal indicative of said manual force, a control for controlling the operation of said electric motor, said control having a sensor input stage receiving the signal from said force sensor and a logic for determining the operation of said electric motor from at least said signal from said force sensor, said force sensor including a first electrical device providing a signal indicative of applied force, a second electrical device providing a signal indicative of applied force, the manual force being applied only to said first electrical device, said first and said second electrical devices being positioned in proximity to each other so as to experience the same temperature and a circuit connecting said first and said second electrical devices to provide a temperature compensated signal to said sensor input stage of said control.

30. An electrically assisted, manually powered unit as set forth in claim 29 wherein the circuit connecting the first and the second electrical devices is a bridging circuit containing first and second resistors in respective series circuits with said first and said second electrical devices.

* * * * *